US012509592B2

United States Patent
Koyanagi (10) Patent No.: US 12,509,592 B2
(45) Date of Patent: Dec. 30, 2025

(54) CONDUCTIVE TWO-DIMENSIONAL PARTICLE-CONTAINING COMPOSITION, CONDUCTIVE FILM, AND METHOD OF PRODUCING CONDUCTIVE TWO-DIMENSIONAL PARTICLE-CONTAINING COMPOSITION

(71) Applicant: Murata Manufacturing Co., Ltd., Nagaokakyo (JP)

(72) Inventor: Masashi Koyanagi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 73 days.

(21) Appl. No.: 18/610,748

(22) Filed: Mar. 20, 2024

(65) Prior Publication Data

US 2024/0270984 A1 Aug. 15, 2024

Related U.S. Application Data

(63) Continuation of application No. PCT/JP2022/031424, filed on Aug. 19, 2022.

(30) Foreign Application Priority Data

Sep. 27, 2021 (JP) ................. 2021-156888

(51) Int. Cl.
C09D 5/24 (2006.01)
C01B 32/907 (2017.01)
(Continued)

(52) U.S. Cl.
CPC .............. C09D 5/24 (2013.01); C01B 32/907 (2017.08); C09D 7/62 (2018.01); C09D 7/70 (2018.01);
(Continued)

(58) Field of Classification Search
CPC .... C09D 5/24; C09D 7/62; C09D 7/70; C01B 32/907; H01B 1/20; H01B 1/06;
(Continued)

(56) References Cited

U.S. PATENT DOCUMENTS 12,431,258 B2 * 9/2025 Yanagimachi ........... H01B 1/20
2014/0162130 A1 * 6/2014 Barsoum ............... C01B 32/914
429/231.8

(Continued)

FOREIGN PATENT DOCUMENTS

WO 2018/066549 A1 4/2018
WO 2021/131643 A1 7/2021
WO WO-2021167747 A2 * 8/2021 ........... C01B 32/914

OTHER PUBLICATIONS

English Translation of International Search Report received for PCT Patent Application No. PCT/JP2022/031424, mailed on Oct. 25, 2022, 2 pages.

(Continued)

*Primary Examiner* — Mark Kopec
*Assistant Examiner* — Jaison P Thomas
(74) *Attorney, Agent, or Firm* — ArentFox Schiff LLP (57) ABSTRACT

A conductive two-dimensional particle-containing composition including: a conductive two-dimensional particle of a layered material including one or a plurality of layers; a dispersion medium having a relative permittivity greater than that of water; and a fluorine element and an oxygen element on a surface of the conductive two-dimensional particle, wherein the one or plurality of layers includes a layer body represented by: $M_mX_n$, wherein M is at least one metal of Group 3, 4, 5, 6, or 7, X is a carbon atom, a nitrogen atom, or a combination thereof, n is 1 to 4, and m is more than n and 5 or less, and a modifier or terminal T existing on a surface of the layer body, wherein T is at least one selected (Continued)

from the group consisting of a hydroxyl group, a fluorine atom, a chlorine atom, an oxygen atom, and a hydrogen atom.

15 Claims, 1 Drawing Sheet

(51) Int. Cl.
  *C09D 7/40* (2018.01)
  *C09D 7/62* (2018.01)
  *H01B 1/20* (2006.01)
  *C08K 9/02* (2006.01)
(52) U.S. Cl.
  CPC ............ *H01B 1/20* (2013.01); *C01P 2002/52* (2013.01); *C01P 2004/20* (2013.01); *C01P 2006/40* (2013.01); *C08K 9/02* (2013.01); *C08K 2201/001* (2013.01); *C08K 2201/011* (2013.01)
(58) Field of Classification Search
  CPC ....... H01B 13/00; H01B 1/00; C01P 2002/52; C01P 2004/20; C01P 2006/40; C08K 9/02; C08K 2201/001; C08K 2201/011; H01G 11/30; C01G 23/00; C04B 35/56
  See application file for complete search history.

(56) References Cited

U.S. PATENT DOCUMENTS

| | | | |
|---|---|---|---|
| 2017/0088429 A1* | 3/2017 | Shin | ............... C01B 21/06 |
| 2017/0294546 A1* | 10/2017 | Ghidiu | ............... C01B 32/949 |
| 2022/0328843 A1 | 10/2022 | Abe | |

OTHER PUBLICATIONS

Kamysbayev, V., et al., "Covalent surface modifications and superconductivity of two-dimensional metal carbide MXenes", Science, Researchgate, 2020, 369(6506):979-983(5 pages).

Zhang, C., et al., "Additive-free MXene inks and direct printing of micro-supercapacitors", Nature Communications, 2019, 10(1):1795, 9 pages.

* cited by examiner

CONDUCTIVE TWO-DIMENSIONAL PARTICLE-CONTAINING COMPOSITION, CONDUCTIVE FILM, AND METHOD OF PRODUCING CONDUCTIVE TWO-DIMENSIONAL PARTICLE-CONTAINING COMPOSITION

CROSS REFERENCE TO RELATED APPLICATIONS

The present application is a continuation of International application No. PCT/JP2022/031424, filed Aug. 19, 2022, which claims priority to Japanese Patent Application No. 2021-156888, filed Sep. 27, 2021, the entire contents of each of which are incorporated herein by reference.

TECHNICAL FIELD

The present disclosure relates to a conductive two-dimensional particle-containing composition, a conductive film, and a method of producing a conductive two-dimensional particle-containing composition.

BACKGROUND ART

In recent years, MXene has been attracting attention as a new material having conductivity. MXene is a type of so-called two-dimensional material, and as will be described later, is a layered material in the form of one or plural layers. In general, MXene is in the form of particles (which can include powders, flakes, nanosheets, and the like) of such a layered material.

Currently, various studies are being conducted toward the application of MXene to various electrical devices. For the above application, it is required to further enhance the conductivity of a material containing MXene. As a part of the study, attempts have been made to improve properties of MXene by controlling a surface functional group of MXene. For example, Non-patent Document 1 shows that when the surface functional group of MXene is any one of O, Cl, S, Se, and Te, the MXene has unique structural and electronic characteristics. Non-patent Document 2 shows that $(Ti_3C_2T_x)$ MXene is applied to functional compositions that can be used in various fields such as electrochemical energy storage, smart electronics, and healthcare. Specifically, an ink in which the $(Ti_3C_2T_x)$ MXene is dispersed in EtOH, DMSO, DMF, or NMP is shown.

Non-patent Document 1: Kamysbayev et al., Covalent surface modifications and superconductivity of two-dimensional metal carbide MXenes: Science 369, 979-983 (2020)

Non-patent Document 2: Zhang et al., Additive-free MXene inks and direct printing of micro-supercapacitors NATURE COMMUNICATIONS (2019) 10:1795

SUMMARY OF THE DISCLOSURE

The MXene described in Non-patent Document 1 is considered to be easily oxidized in air. Thus, for example, when a conductive film is formed, it is considered that the structure of MXene needs to be further studied in order for the conductive film to exhibit high conductivity and maintain high conductivity for a long period of time. Although Non-patent Document 2 discloses a composition in which MXene is dispersed in DMSO or the like, the conductivity of a conductive film formed using the composition is significantly reduced after a lapse of six months. The present disclosure has been made in view of the above circumstances, and an object of the present disclosure is to provide a composition containing conductive two-dimensional particles (MXene) in which, for example, when a conductive film is formed, the conductive film exhibits high conductivity and can maintain high conductivity for a long period of time, a conductive film which is formed from the composition and exhibits high conductivity, and a method of producing a conductive two-dimensional particle-containing composition.

According to one aspect of the present disclosure, a conductive two-dimensional particle-containing composition is provided, which includes a conductive two-dimensional particle of a layered material including one or a plurality of layers; a dispersion medium having a relative permittivity greater than that of water; a fluorine element on a surface of the conductive two-dimensional particle; and an oxygen element on the surface of the conductive two-dimensional particle, the one or plurality of layers including a layer body represented by:

$$M_mX_n$$

wherein M is at least one metal of Group 3, 4, 5, 6, or 7,
X is a carbon atom, a nitrogen atom, or a combination thereof,
n is 1 to 4, and
m is more than n and 5 or less, and
a modifier or terminal T existing on a surface of the layer body, wherein T is at least one selected from the group consisting of a hydroxyl group, a fluorine atom, a chlorine atom, an oxygen atom, and a hydrogen atom, and
the conductive two-dimensional particle has a fluorine element and an oxygen element.

According to another aspect of the present disclosure, there is provided a method of producing a conductive two-dimensional particle-containing composition, the method including:

(a) preparing a precursor represented by:

$$M_mAX_n$$

wherein M is at least one metal of Group 3, 4, 5, 6, or 7,
X is a carbon atom, a nitrogen atom, or a combination thereof,
A is at least one element of Group 12, 13, 14, 15, or 16,
n is 1 to 4, and
m is more than n and 5 or less;

(b) removing at least a part of A atoms from the precursor using an etching solution to produce an etched product;

(c) washing the etched product with water to obtain a water-washed product;

(d) performing an intercalation treatment including stirring a mixed solution of the water-washed product and a compound for interlayer insertion of the water-washed product to produce an intercalated product; and (e) delamination of the intercalated product and mixing of a dispersion medium having a relative permittivity greater than that of water with the intercalated product.

According to the present disclosure, the conductive two-dimensional particle-containing composition which is formed of a predetermined layered material (also referred to as "MXene" in the present specification), contains conductive two-dimensional particles having a fluorine element and an oxygen element, and a dispersion medium having a relative permittivity greater than that of water, whereby there is provided a conductive two-dimensional particle-containing composition which contains MXene, exhibits a high conductivity, can maintain a high conductivity for a long period of time, and is useful, for example, for forming a conductive film.

BRIEF DESCRIPTION OF THE DRAWINGS

FIGS. 1(a) and 1(b) are schematic cross-sectional views showing MXene which is a layered material usable for a conductive two-dimensional particle-containing composition according to one embodiment of the present disclosure, wherein FIG. 1(a) shows a single-layer MXene, and FIG. 1(b) shows a multilayer (illustratively, two layers) MXene.

DETAILED DESCRIPTION

Embodiment 1: Conductive Two-Dimensional Particle-Containing Composition

Hereinafter, a conductive two-dimensional particle-containing composition according to one embodiment of the present disclosure will be described in detail, but the present disclosure is not limited to such an embodiment.

The conductive two-dimensional particle-containing composition according to the present embodiment includes a conductive two-dimensional particle of a layered material including one or a plurality of layers and a dispersion medium having a relative permittivity greater than that of water, the one or plurality of layers includes a layer body represented by:

$$M_m X_n$$

wherein M is at least one metal of Group 3, 4, 5, 6, or 7,
X is a carbon atom, a nitrogen atom, or a combination thereof,
n is 1 to 4, and
m is more than n and 5 or less, and
a modifier or terminal T existing on a surface of the layer body, wherein T is at least one selected from the group consisting of a hydroxyl group, a fluorine atom, a chlorine atom, an oxygen atom, and a hydrogen atom, and the conductive two-dimensional particle has a fluorine element and an oxygen element. Since the conductive two-dimensional particle-containing composition has the conductive two-dimensional particles and a dispersion medium having a relative permittivity greater than that of water, it is possible to form, for example, a conductive film which has high initial conductivity and in which deterioration over time of conductivity is suppressed.

The layered material can be understood as a layered compound and is also denoted by "$M_m X_n T_s$", in which s is an optional number, and in the related art, x or z may be used instead of s. Typically, n can be 1, 2, 3, or 4, but is not limited thereto.

In the above formula of MXene, M is preferably at least one selected from the group consisting of Ti, Zr, Hf, V, Nb, Ta, Cr, Mo, and Mn, and more preferably at least one selected from the group consisting of Ti, V, Cr, and Mo.

MXenes whose above formula $M_m X_n$ is expressed as below are known:

Sc$_2$C, Ti$_2$C, Ti$_2$N, Zr$_2$C, Zr$_2$N, Hf$_2$C, Hf$_2$N, V$_2$C, V$_2$N, Nb$_2$C, Ta$_2$C, Cr$_2$C, Cr$_2$N, Mo$_2$C, Mo$_{1.3}$C, Cr$_{1.3}$C, (Ti, V)$_2$C, (Ti,Nb)$_2$C, W$_2$C, W$_{1.3}$C, Mo$_2$N, Nb$_{1.3}$C, Mo$_{1.3}$Y$_{0.6}$C (in the above formula, "1.3" and "0.6" mean about 1.3 (=4/3) and about 0.6 (=2/3), respectively), Ti$_3$C$_2$, Ti$_3$N$_2$, Ti$_3$(CN), Zr$_3$C$_2$, (Ti, V)$_3$C$_2$, (Ti$_2$Nb)C$_2$, (Ti$_2$Ta)C$_2$, (Ti$_2$Mn)C$_2$, Hf$_3$C$_2$, (Hf$_2$V)C$_2$, (Hf$_2$Mn)C$_2$, (V$_2$Ti)C$_2$, (Cr$_2$Ti)C$_2$, (Cr$_2$V)C$_2$, (Cr$_2$Nb)C$_2$, (Cr$_2$Ta)C$_2$, (Mo$_2$Sc)C$_2$, (Mo$_2$Ti)C$_2$, (Mo$_2$Zr)C$_2$, (Mo$_2$Hf)C$_2$, (Mo$_2$V)C$_2$, (Mo$_2$Nb)C$_2$, (Mo$_2$Ta)C$_2$, (W$_2$Ti)C$_2$, (W$_2$Zr)C$_2$, (W$_2$Hf)C$_2$, Ti$_4$N$_3$, V$_4$C$_3$, Nb$_4$C$_3$, Ta$_4$C$_3$, (Ti,Nb)$_4$C$_3$, (Nb,Zr)$_4$C$_3$, (Ti$_2$Nb$_2$)C$_3$, (Ti$_2$Ta$_2$)C$_3$, (V$_2$Ti$_2$)C$_3$, (V$_2$Nb$_2$)C$_3$, (V$_2$Ta$_2$)C$_3$, (Nb$_2$Ta$_2$)C$_3$, (Cr$_2$Ti$_2$)C$_3$, (Cr$_2$V$_2$)C$_3$, (Cr$_2$Nb$_2$)C$_3$, (Cr$_2$Ta$_2$)C$_3$, (Mo$_2$Ti$_2$)C$_3$, (Mo$_2$Zr$_2$)C$_3$, (Mo$_2$Hf$_2$)C$_3$, (Mo$_2$V$_2$)C$_3$, (Mo$_2$Nb$_2$)C$_3$, (Mo$_2$Ta$_2$)C$_3$, (W$_2$Ti$_2$)C$_3$, (W$_2$Zr$_2$)C$_3$, (W$_2$Hf$_2$)C$_3$, (Mo$_{2.7}$V$_{1.3}$)C$_3$ (in the above formula, "2.7" and "1.3" mean about 2.7 (=8/3) and about 1.3 (=4/3), respectively), Typically in the above formula, M can be titanium or vanadium and X can be a carbon atom or a nitrogen atom. For example, the MAX phase that is a precursor of MXene is Ti$_3$AlC$_2$ and MXene is Ti$_3$C$_2$T$_s$ (in other words, M is Ti, X is C, n is 2, and m is 3).

It is noted that, in the present embodiment, MXene may contain remaining A atoms at a relatively small amount, for example, at 10% by mass or less with respect to the original amount of A atoms. The remaining amount of A atoms can be preferably 8% by mass or less, and more preferably 6% by mass or less. However, even if the residual amount of A atoms exceeds 10% by mass, there may be no problem depending on the application and use conditions of the electrode.

Hereinafter, conductive two-dimensional particles (also referred to as "MXene particles") in the conductive two-dimensional particle-containing composition according to the present embodiment will be described with reference to FIG. 1.

Figure 1A:
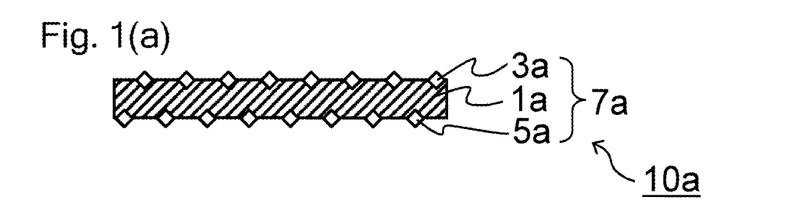
Figure 1B:
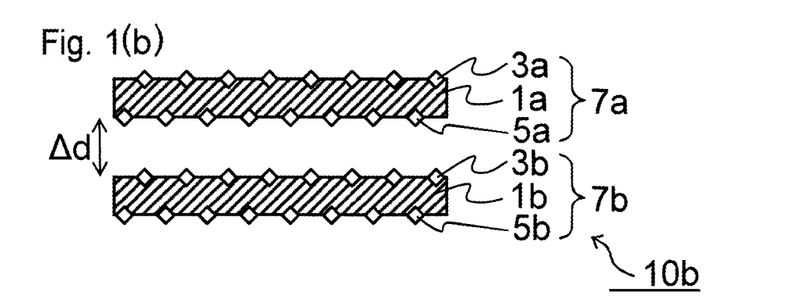

The conductive two-dimensional particle according to the present embodiment is an aggregate containing one layer of MXene 10a (single-layer MXene) schematically illustrated in FIG. 1(a). More specifically, MXene 10a is an MXene layer 7a having a layer body ($M_m X_n$ layer) 1a represented by $M_m X_n$, and modifiers or terminals T3a and 5a existing on a surface (more specifically, at least one of two surfaces facing each other in each layer) of the layer body 1a. Therefore, the MXene layer 7a is also represented as "$M_m X_n T_s$", and s is an optional number.

The particle of the layered material according to the present embodiment may include one layer and plural layers. Examples of the MXene (multilayer MXene) of the plurality of layers include, but are not limited to, two layers of MXene 10b as schematically shown in FIG. 1(b). 1b, 3b, 5b, and 7b in FIG. 1(b) are the same as 1a, 3a, 5a, and 7a in FIG. 1(a) described above. In the multilayer MXene, two adjacent MXene layers (e.g., 7a and 7b) may not necessarily be completely separated from each other, but may be partially in contact with each other. The MXene 10a may be a mixture of the single-layer MXene 10a and the multilayer MXene 10b, in which the multilayer MXene 10b is individually separated and exists as one layer and the unseparated multilayer MXene 10b remains. Even when the multilayer MXene is included, the multilayer MXene is preferably MXene having a few layers obtained through the delamination treatment. The "small number of layers" means, for example, that the number of stacked layers of MXene is 10 or less. Hereinafter, the "multilayer MXene having a small number of layers" may be referred to as a "few-layer MXene". The thickness of the few-layer MXene in a stacking direction is preferably 15 nm or less, and more preferably 10 nm or less. In addition, the single-layer MXene and the few-layer MXene may be collectively referred to as "single-layer/few-layer MXene" in some cases.

The particles of the layered material according to the present embodiment preferably contain a large amount of single-layer/few-layer MXene. By containing a large amount of single-layer/few-layer MXene, a specific surface area of MXene can be made larger than that of the multilayer MXene, and as a result, as shown in Examples described later, deterioration over time of electrode characteristics can be further suppressed. For example, in the particles of the layered material according to the present embodiment, the number of stacked layers of MXene is 10 or less, the thickness is 15 nm or less, and preferably 10 nm or less, and a ratio of the single-layer/few-layer MXene to the total MXene is preferably 80 vol % or more, more preferably 90 vol % or more, and still more preferably 95 vol % or more. The volume of the single-layer MXene is more preferably larger than the volume of the few-layer MXene. Since a true density of these MXenes does not greatly vary depending on the existence form, it can be said that it is more preferable that the mass of the single-layer MXene is larger than the mass of the few-layer MXene. When these relationships are satisfied, the specific surface area can be further increased, and deterioration over time of conductivity can be further suppressed. Most preferably, the particle of the layered material according to the present embodiment includes only the single-layer MXene.

Although the present embodiment is not limited, the thickness of each layer of MXene (which corresponds to the MXene layers 7a and 7b) can be, for example, 1 nm to 30 μm, may be, for example, 1 nm to 5 nm, or further 1 nm to 3 nm (the thickness may mainly vary depending on the number of M atomic layers included in each layer). For the individual laminates of the multilayer MXene that can be included, the interlayer distance (alternatively, a void dimension is indicated by Δd in FIG. 1(b)) is, for example, 0.8 nm to 10 nm, particularly 0.8 nm to 5 nm, and more particularly about 1 nm, and the total number of layers can be 2 to 20,000.

(Fluorine Element and Oxygen Element)

The conductive two-dimensional particle has a fluorine element and an oxygen element on a surface thereof. Having a fluorine element and an oxygen element means that these elements are bonded and adsorbed to the surface of MXene, for example, in the form of ions. When the conductive two-dimensional particle has a fluorine element and an oxygen element having a small atomic radius, for example, the oxygen element and the fluorine element having a small atomic radius are present on the surface of the layer body included in MXene, the interlayer distance is narrowed, the structure is stabilized to enhance oxidation resistance, moisture absorption due to insertion of water molecules between layers is suppressed, and high moisture absorption resistance can be realized. The presence of the fluorine atom and the oxygen atom in the conductive two-dimensional particle can be confirmed by an XPS method as described later.

(Chlorine, Phosphate Ion, Iodine, and Sulfate Ion)

In the conductive two-dimensional particle, the modifier or terminal T may contain a chlorine atom, or M of the layer may be bonded to at least one selected from the group consisting of $PO_4^{3-}$, I, and $SO_4^{2-}$. The chlorine atom, $PO_4^{3-}$, I, and $SO_4^{2-}$ may be derived from a raw material used in the step of producing conductive two-dimensional particles. The chlorine atom and I may be present in the form of an ion. As described above, the modifier or terminal T contains a chlorine atom, or the M of the layer and at least one selected from the group consisting of $PO_4^{3-}$, I, and $SO_4^{2-}$ are bonded to each other, so that single-layer formation is likely to occur in the production process of the conductive two-dimensional particle, and a composition containing a larger amount of single-layer/few-layer MXene as the conductive two-dimensional particles is obtained. As a conductive film formed using the composition, a conductive film having higher conductivity can be obtained, which is preferable. The presence of these chlorine atoms and the like on the surface of the conductive two-dimensional particle can be confirmed by the XPS method as described later.

A proportion (MXene content) of the conductive two-dimensional particles contained in the conductive two-dimensional particle-containing composition is not particularly limited, and for example, since a thick conductive film is formed, the MXene content in the composition can be 1% by mass or more in terms of solid content. The conductive two-dimensional particles are hardly dispersed, and it is difficult to form a composition; however, according to the conductive two-dimensional particle-containing composition according to the present embodiment, the conductive two-dimensional particles are easily dispersed in a dispersion medium having a relative permittivity greater than that of water, so that a composition in which the conductive two-dimensional particles have a high dispersion ratio can be formed. By using a composition having a high dispersion ratio as described above, for example, for film formation, it is possible to produce a conductive film that requires a large thickness, for example, for electrode applications, with high productivity. The proportion of the conductive two-dimensional particles may further be 0.01% by mass or more in terms of solid content. The proportion of the conductive two-dimensional particles may further be 1.5% by mass or more in terms of solid content. In consideration of dispersibility of the conductive two-dimensional particles, the upper limit of the proportion is, for example, 10% by mass in terms of solid content.

(Dispersion Medium)

In the conductive two-dimensional particle-containing composition according to the present embodiment, a dispersion medium having a relative permittivity greater than that of water is used as a dispersion medium for dispersing conductive two-dimensional particles. In the dispersion medium having a relative permittivity greater than that of water, the charge of the conductive two-dimensional particles (MXene particles) becomes more stable, so that dispersibility is improved. For high dispersion stability, it is possible to achieve the conductive two-dimensional particle-containing composition in which the conductive two-dimensional particles (MXene particles) are dispersed at a high content without aggregation. For example, by forming a film using this highly dispersed conductive two-dimensional particle-containing composition, a conductive film having high orientation and high conductivity can be achieved. The relative permittivity of water is 80.4 at 20° C., and the dispersion medium for dispersing the conductive two-dimensional particles may be greater than the relative permittivity of water at 20° C. For example, a dispersion medium having a relative permittivity of more than 80 or 100 or more can be used. Hereinafter, the dispersion medium having a relative permittivity greater than that of water may be referred to as a "high relative permittivity dispersion medium".

Examples of the dispersion medium having a relative permittivity greater than that of water include N-methylformamide (NMF, relative permittivity: 171) and N-methylacetamide (NMAc, relative permittivity: 179), and one or more of these can be used.

In the present embodiment, as long as the relative permittivity is greater than that of water, a mixed dispersion medium of the high relative permittivity dispersion medium and another dispersion medium may be used. Preferable examples of the dispersion medium include a dispersion medium containing at least one of N-methylformamide and N-methylacetamide which are high relative permittivity dispersion media. More preferably, the dispersion medium contains 50 vol % or more of at least one of N-methylformamide and N-methylacetamide. Examples of the other dispersion medium include a dispersion medium having a relative permittivity of 10 or more, and examples thereof include an aqueous dispersion medium and an organic dispersion medium. The aqueous dispersion medium is typically water, and in some cases, an aqueous solution containing a relatively small amount (e.g., 30% by mass or less, preferably 20% by mass or less based on the whole mass) of other liquid substances in addition to water can be mentioned. Examples of the organic dispersion medium include alcohols including acetonitrile (relative permittivity: 38), N, N-dimethylacetamide (relative permittivity: 38), N, N-dimethylformamide (relative permittivity: 37), DMSO (relative permittivity: 47), DMF (relative permittivity: 37), NMP (relative permittivity: 32), acetone (relative permittivity: 20), 2-methyl 2-propanol (relative permittivity: 10), isopropyl alcohol (relative permittivity: 18), ethanol (relative permittivity: 25), and methanol (relative permittivity: 33). As the dispersion medium having a relative permittivity greater than that of water, NMF having a high relative permittivity is preferably included, and most preferably, the dispersion medium consists of NMF.

(Additive)

The conductive two-dimensional particle-containing composition according to the present embodiment may contain amines such as tetramethylammonium hydroxide, hexylamine, and octylamine, and additives such as polyphosphoric acid and sodium ascorbate, in addition to the conductive two-dimensional particles and the dispersion medium. The proportion of the additive in the composition is not particularly limited, and from the viewpoint of increasing the concentration of the conductive two-dimensional particles and the like, the proportion of the additive in the composition may be, for example, suppressed to 10% by mass or less.

(Form of Composition)

Examples of the conductive two-dimensional particle-containing composition according to the present embodiment include inks, pastes, and slurries.

As the paste, a conductive paste of a composite material containing a polymer is exemplified as one embodiment. A mass ratio of the conductive two-dimensional particles (particles of the layered material) in the conductive paste is, for example, 50% or more. Examples of the polymer include hydrophilic polymers (including those exhibiting hydrophilicity by mixing a hydrophilic auxiliary agent in a hydrophobic polymer, and those in which a surface of a hydrophobic polymer or the like is subjected to hydrophilization treatment), and as the hydrophilic polymer, it is more preferable to include one or more selected from the group consisting of polysulfone, cellulose acetate, regenerated cellulose, polyether sulfone, water-soluble polyurethane, polyvinyl alcohol, sodium alginate, an acrylic acid-based water-soluble polymer, polyacrylamide, polyaniline sulfonic acid, and nylon.

The hydrophilic polymer is more preferably a hydrophilic polymer having a polar group, in which the polar group is a group that forms a hydrogen bond with the modifier or terminal T of the layer. As the polymer, for example, one or more polymers selected from the group consisting of water-soluble polyurethane, polyvinyl alcohol, sodium alginate, an acrylic acid-based water-soluble polymer, polyacrylamide, polyaniline sulfonic acid, and nylon are preferably used.

Among these, one or more polymers selected from the group consisting of water-soluble polyurethane, polyvinyl alcohol, and sodium alginate are more preferable. As the polymer, a polymer having a urethane bond having both a hydrogen bond donor property and a hydrogen bond acceptor property is preferable, and from this viewpoint, the water-soluble polyurethane is particularly preferable.

Embodiment 2: Method of Producing Conductive Two-Dimensional Particle-Containing Composition Hereinafter, a method of producing a conductive two-dimensional particle-containing composition according to an embodiment of the present disclosure will be described in detail, but the present disclosure is not limited to such an embodiment.

The method of producing a conductive two-dimensional particle-containing composition according to the present embodiment includes:

(a) preparing a precursor represented by:

$$M_mAX_n$$

wherein M is at least one metal of Group 3, 4, 5, 6, or 7,
X is a carbon atom, a nitrogen atom, or a combination thereof,
A is at least one element of Group 12, 13, 14, 15, or 16,
n is 1 to 4, and
m is more than n and 5 or less;

(b) removing at least a part of A atoms from the precursor using an etching solution to produce an etched product;
(c) washing the etched product with water to obtain a water-washed product;
(d) performing an intercalation treatment including stirring a mixed solution of the water-washed product and a compound for interlayer insertion of the water-washed product to produce an intercalated product; and
(e) delamination of the intercalated product and mixing a dispersion medium having a relative permittivity greater than that of water with the intercalated product. By this production method, it is possible to produce a conductive two-dimensional particle-containing composition which is optimal for production of a conductive film or the like capable of maintaining high conductivity for a long period of time.

Hereinafter, each step of the production method will be described in detail.

Step (a)

First, a predetermined precursor is prepared. A predetermined precursor that can be used in the present embodiment is a MAX phase that is a precursor of MXene, and is represented by a formula below:

$$M_mAX_n$$

wherein M is at least one metal of Group 3, 4, 5, 6, or 7,
X is a carbon atom, a nitrogen atom, or a combination thereof,
A is at least one metal of Group 12, 13, 14, 15, or 16,
n is 1 to 4, and
m is more than n and 5 or less.

The above M, X, n, and m are as described in MXene. A is at least one element of Group 12, 13, 14, 15, or 16, is usually a Group A element, typically Group IIIA and Group IVA, more specifically, may include at least one selected from the group consisting of Al, Ga, In, Tl, Si, Ge, Sn, Pb, P, As, S, and Cd, and is preferably Al.

The MAX phase has a crystal structure in which a layer constituted by A atoms is located between two layers represented by $M_mX_n$ (each X may have a crystal lattice located in an octahedral array of M). Typically, in the case of m=n+1, the MAX phase has a repeating unit in which one layer of X atoms is disposed between the layers of M atoms of n+1 layers (these layers are also collectively referred to as "$M_mX_n$ layer"), and a layer of A atoms ("A atom layer") is disposed as a next layer of the (n+1)th layer of M atoms; however, the present disclosure is not limited thereto.

The MAX phase can be produced by a known method. For example, a TiC powder, a Ti powder, and an Al powder are mixed in a ball mill, and the obtained mixed powder is calcined under an Ar atmosphere to obtain a calcined body (block-shaped MAX phase). Thereafter, the calcined body obtained is pulverized by an end mill to obtain a powdery MAX phase for the next step.

Step (b)

Etching is performed to remove at least a part of A atoms from the precursor using an etching solution. The etching solution preferably contains one or more of HF, $H_3PO_4$, HCl, HI, and $H_2SO_4$. The etching solution more preferably contains at least one of HF (hydrofluoric acid) and $H_3PO_4$ (phosphoric acid). For example, it is also possible to perform etching by a so-called MILD method in which HCl and LiF contained in an etching solution are reacted in a system to generate HF; however, it is preferable to perform etching by a so-called ACID method in which etching is performed by an etching solution containing HF (hydrofluoric acid) or by an etching solution containing phosphoric acid. According to these methods, as compared with the MILD method, particles (MXene particles) of a flaky layered material having a large flat region with a number average Feret diameter of preferably 3 μm or more can be easily obtained, which is preferable. Other conditions for etching are not particularly limited, and known conditions can be adopted. As the etching solution, a mixed solution of the acid and, for example, pure water as a solvent may be used. As the etching solution, an etching solution satisfying at least one selected from the group consisting of an HF concentration of 1.5 M to 14 M, an $H_3PO_4$ concentration of 5.5 M or more, an HCl concentration of 6.0 M or more, an HI concentration of 5.0 M or more, and an $H_2SO_4$ concentration of 5.0 M or more can be used. In the etching of the A atoms, a part of the M atoms may be selectively etched together with the A atoms. Examples of an etched product obtained by the etching include slurry.

Step (c)

The etched product obtained by the etching is washed with water. By performing water washing, the acid and the like used in the etching can be sufficiently removed. An amount of water mixed with the etched product and a washing method are not particularly limited. For example, stirring, centrifugation, and the like may be performed by adding water. Examples of the stirring method include stirring using a handshake, an automatic shaker, a share mixer, a pot mill, or the like. The degree of stirring such as the stirring speed and the stirring time may be adjusted according to the amount, concentration, and the like of an object to be treated. The washing with water may be performed one or more times. Preferably, the washing with water is performed a plurality of times. For example, specifically, steps (i) to (iv): (i) adding water (to an etched product or the remaining precipitate obtained in (iii) below), (ii) stirring the mixture, (iii) centrifuging a stirred product, (iv) discarding a supernatant after centrifugation and collecting the remaining precipitate may be performed within a range of 2 times or more and, for example, 15 times or less.

Step (d)

A compound for interlayer insertion is intercalated, the intercalation including a step of stirring a mixed solution obtained by mixing a treated product (water-washed product) obtained by the water washing with the compound for interlayer insertion of the water-washed product.

The compound for interlayer insertion of a water treatment product may be of any specific type as long as it is a compound that can be inserted between layers of the water treatment product and can separate the water treatment product into layers by delamination in step (e) which is the next step. The compound for interlayer insertion is preferably an alkali metal compound or an alkaline earth metal compound. A Li-containing compound is more preferable. As the Li-containing compound, an ionic compound in which a Li ion and a cation are bonded can be used. Examples of the lithium ion include halides such as iodide, chloride, and fluoride, sulfide salts such as hydroxides, phosphates, and sulfates, nitrates, acetates, and carboxylates.

The content of the compound for interlayer insertion in an intercalation formulation is preferably 0.001% by mass or more. The content is more preferably 0.01% by mass or more, and still more preferably 0.1% by mass or more. On the other hand, from the viewpoint of dispersibility in a solution, the content of the compound for interlayer insertion is preferably 10% by mass or less, and more preferably 1% by mass or less.

The specific method of intercalation is not particularly limited, and for example, the compound for interlayer insertion may be mixed with a moisture medium clay of the MXene and stirred, or may be allowed to stand. For example, stirring at room temperature can be mentioned. Examples of the stirring method include a method using a stirring bar such as a stirrer, a method using a stirring blade, a method using a mixer, and a method using a centrifugal device. The stirring time can be set according to the manufacturing scale of the electrode, and for example, the stirring time may be set to 12 to 24 hours.

Step (e)

Using an intercalated product obtained by the intercalation treatment in the step (d), delamination of the intercalated product and mixing of a dispersion medium having a relative permittivity greater than that of water are performed to form a composition.

The delamination can make the MXene into a single layer and reduce the number of layers of MXene. Examples of the stirring method include stirring using a handshake, an automatic shake, or the like. The degree of stirring such as the stirring speed and the stirring time may be adjusted according to the amount, concentration, and the like of an object to be treated. In the production method of the present embodiment, an ultrasonic treatment is not performed as delamination. As described above, since the ultrasonic treatment is not performed, particle breakage hardly occurs, and as a result, a single-layer/few-layer MXene having a large plane parallel to the layer of particles, that is, a large two-dimensional plane, and a large number average Feret diameter can be obtained as the particles of the layered material.

The dispersion medium having a relative permittivity greater than that of water, which is used for mixing, is as described above for the dispersion medium having a relative permittivity greater than that of water contained in the conductive two-dimensional particle-containing composition, which is described above.

In the method of producing a conductive two-dimensional particle-containing composition according to the present embodiment, specific embodiments of the step (d) and the step (e) can take the following aspect (I), (II), or (III) as a plurality of aspects. The aspects (I), (II), and (III) are described below.

(I) The mixed solution of the water-washed product and the compound for interlayer insertion of the water-washed product is made alkaline in the step (d), and the intercalated product and the dispersion medium having a relative permittivity greater than that of water are mixed, and delamination and mixing of the dispersion medium having a relative permittivity greater than that of water are performed together in the step (e).

(II) The mixed solution of the water-washed product and the compound for interlayer insertion of the water-washed product is made acidic in the step (d), and the intercalated product is subjected to delamination, and then a delaminated product obtained by the delamination and the dispersion medium having a relative permittivity greater than that of water are mixed to form a composition in the step (e).

(III) The mixed solution of the water-washed product and the compound for interlayer insertion of the water-washed product is made acidic in the step (d), and the intercalated product and the dispersion medium having a relative permittivity greater than that of water are mixed, and delamination and mixing of the dispersion medium having a relative permittivity greater than that of water are performed together in the step (e).

In the above aspect (I), the mixed solution of the water-washed product and the compound for interlayer insertion of the water-washed product in the step (d) may be alkaline. For example, pH may be in a range of 8 to 14. The method for making the mixed solution alkaline is not limited. For example, a mixed solution containing a hydroxide as the compound for interlayer insertion, preferably lithium hydroxide as the Li-containing compound can be mentioned. Alternatively, a mixed solution containing the compound for interlayer insertion and a hydroxide such as ammonia, potassium hydroxide, sodium hydroxide, calcium hydroxide, or magnesium hydroxide may be used as the pH adjusting agent.

In the above aspect (I) and aspect (III), the intercalated product and the dispersion medium having a relative permittivity greater than that of water are mixed in the step (e), and delamination and mixing of the dispersion medium having a relative permittivity greater than that of water are performed together. For example, as shown in Examples described later, the intercalated product and the dispersion medium having a relative permittivity greater than that of water are mixed to obtain a mixture for stirring. The mixture for stirring may contain the intercalated product in a solid content of not less than 0.1 g and not more than 10 g (in the production scale, the solid contents of the dispersion medium and the intercalated product are both increased at this ratio) with respect to 1 mL to 100 mL of the dispersion medium. The mixture for stirring may be stirred at 20 to 25° C. (room temperature). A stirred product obtained by stirring may be further stirred using, for example, a handshake, an automatic shaker, a stirrer, a stirring blade, or the like, and then centrifuged by a centrifuge to recover a supernatant, then the obtained supernatant may be centrifuged, then the supernatant may be discarded, and the remaining precipitate may be obtained as a composition containing conductive two-dimensional particles having a high dispersion ratio.

In the above aspect (II) and aspect (III), the mixed solution of the water-washed product and the compound for interlayer insertion of the water-washed product in the step (d) may be acidic. For example, pH may be in a range of not less than 0 and not more than 6. The method of acidifying the mixed solution is not limited. For example, a mixed solution containing a chloride as the compound for interlayer insertion, preferably lithium chloride as the Li-containing compound can be mentioned. Alternatively, a mixed solution containing the compound for interlayer insertion and an inorganic acid such as hydrochloric acid, phosphoric acid, or sulfuric acid may be used as the pH adjusting agent.

In the above aspect (II), in the step (e), after the intercalated product is subjected to delamination using the aqueous dispersion medium, a delaminated product obtained by the delamination and the dispersion medium having a relative permittivity greater than that of water are mixed to form a composition.

The delamination includes stirring the treated product obtained by the intercalation in the step (d) in an aqueous dispersion medium such as pure water. For example, a slurry after the intercalation is centrifuged to discard a supernatant, then pure water is added to the remaining precipitate, then stirring is performed by, for example, a handshake or an automatic shaker, then centrifugation is performed to repeatedly recover the supernatant, then the recovered supernatant is centrifuged, and then the generated supernatant is discarded to obtain a clay-like single-layer/few-layer MXene as a delaminated product.

After the delamination, the delaminated product is stirred in the dispersion medium having a relative permittivity greater than that of water. A stirred product obtained by stirring may be further stirred using, for example, a handshake, an automatic shaker, a wet dispersing machine, ultrasonic waves, or the like, and then centrifuged by a centrifuge to recover a supernatant, then the obtained supernatant may be centrifuged, then the supernatant may be discarded, and the remaining precipitate may be obtained as a conductive two-dimensional particle-containing composition having a high dispersion ratio.

Embodiment 3: Conductive Film Including Conductive Two-Dimensional Particle-Containing Composition The present embodiment includes a conductive film obtained using the conductive two-dimensional particle-containing composition. The conductive film formed of the conductive two-dimensional particle-containing composition has high orientation and exhibits high conductivity. In the conductive film formed of the conductive two-dimensional particle-containing composition according to the present embodiment, the conductivity obtained by substituting a thickness of the conductive film measured with a micrometer, a scanning electron microscope (SEM), or a stylus surface profiler and a surface resistivity of the conductive film measured by a four-point probe method into the following formula can achieve, for example, 5,000 S/cm or more.

Conductivity[S/cm]=1/(thickness[cm] of conductive film×surface resistivity[Q/□] of conductive film)

A method of forming the conductive film is not limited, and examples thereof include filtration, coating, and immersion. Examples of the filtration method include suction filtration of the composition. As a filter for suction filtration, for example, a membrane filter (Durapore, manufactured by Merck KGaA, pore size 0.45 μm) can be used. Examples of the coating method include a spray coating method in which spray coating is performed using a nozzle such as a one-fluid nozzle, a two-fluid nozzle, or an air brush, a slit coating method using a table coater, a comma coater, or a bar coater, a screen printing method, a metal mask printing method, a spin coating, immersion, brush, and dropping.

The coating and drying may be repeated a plurality of times as necessary until a conductive film having a desired thickness is obtained. The drying and curing may be performed, for example, at a temperature of 80° C. or higher and 400° C. or lower using a normal pressure oven or a vacuum oven.

The resulting conductive film may be utilized for applications where maintaining high conductivity (reducing a decrease in initial conductivity and preventing oxidation) is required, such as electrodes in any suitable electrical device or electromagnetic shielding (EMI shielding). The electrode is not particularly limited, and may be, for example, a capacitor electrode, a battery electrode, a biological signal sensing electrode, a sensor electrode, an antenna electrode, or the like. By using the conductive film according to the present embodiment, a large-capacity capacitor and battery, a low-impedance biometric signal sensing electrode, a highly sensitive sensor, and an antenna can be obtained even with a smaller volume (device occupied volume).

EXAMPLES

[Preparation of Single-Layer MXene]

Examples 1 to 5

In Examples 1 to 5, a MXene-containing composition was prepared by sequentially performing (1) preparation of a precursor (MAX), (2) etching of the precursor, (3) washing after etching, (4) intercalation of Li, and (5) delamination and mixing of a high relative permittivity dispersion medium, which are described in detail below. That is, in Examples 1 to 5, the dispersion medium was replaced from water to a prescribed dispersion medium before MXene was formed into a single layer.
(1) Preparation of Precursor (MAX)
TiC powder, Ti powder, and Al powder (all manufactured by Kojundo Chemical Laboratory Co., Ltd.) were placed in a ball mill containing zirconia balls at a molar ratio of 2:1:1 and mixed for 24 hours. The obtained mixed powder was calcined at 1350° C. for 2 hours under an Ar atmosphere. The calcined body (block-shaped MAX) thus obtained was pulverized with an end mill to a maximum dimension of 40 μm or less. In this way, $Ti_3AlC_2$ particles were obtained as a precursor (powdery MAX).
(2) Etching of Precursor
Using the $Ti_3AlC_2$ particles (powder) prepared by the above method, etching was performed under the following etching conditions to obtain a solid-liquid mixture (slurry) containing a solid component derived from the $Ti_3AlC_2$ powder.
(Etching Conditions)
Precursor: $Ti_3AlC_2$ (sieving with a mesh size of 45 μm)
Etching solution composition: 49% HF and $H_2O$ in the amounts shown in Table 1 below
Amount of precursor input: 3.0 g
Reaction vessel: 100 mL Aiboy
Etching temperature: 35° ° C.
Etching time: 24 h
Stirrer rotation speed: 400 rpm

TABLE 1

|  | HF (mL) | $H_2O$ (mL) |
|---|---|---|
| Example 1 | 6 | 54 |
| Example 2 | 18 | 42 |
| Example 3 | 30 | 30 |
| Example 4 | 60 | 0 |
| Example 5 | 6 | 54 |

(3) Washing after Etching
The slurry was equally divided into two portions, each of which was inserted into two 50 mL centrifuge tubes. Then, centrifugation was performed at 3500 G for 5 minutes using a centrifuge, and then the supernatant was discarded. Thereafter, (i) 35 mL of pure water was added to the remaining precipitate in each centrifuge tube, (ii) the mixture was stirred with a handshake, (iii) the mixture was centrifuged at 3,500 G for 5 minutes, and (iv) the supernatant was removed. The steps (i) to (iv) were repeated 10 times in total. Finally, centrifugation was performed at 3500 G for 5 minutes using a centrifuge, and then the supernatant was discarded to obtain a $Ti_3C_2T_s$-moisture medium clay.
(4) Li Intercalation
The $Ti_3C_2T_s$-moisture medium clay prepared by the above method was stirred under the following conditions to intercalate Li ions.
(Conditions of Li Intercalation)
$Ti_3C_2T_s$-moisture medium clay (MXene after washing): solid content 0.75 g
Pure water: 20 mL
Li ion source: 15 mL of pure water+0.75 g of LiOH
Reaction vessel: 100 mL Aiboy
Temperature: 20 to 25° C. (room temperature)
Stirring time: 18 hours
Stirring rotation speed: 700 rpm
After completion of the stirring, the stirred product was transferred to a 50 mL centrifuge tube, and centrifuged at 3500 G for 5 minutes using a centrifuge, and then the supernatant was discarded. Thereafter, (i) after 35 mL of pure water was added to the remaining precipitate, (ii) the mixture was stirred with a handshake, (iii) the mixture was centrifuged at 3500 G for 5 minutes, and (iv) the supernatant was removed. The steps (i) to (iv) were repeated 5 times in total. Finally, centrifugation was performed at 3500 G for 5 minutes using a centrifuge, and then the supernatant was discarded to obtain a water-washed product.

(5) Delamination and Mixing of High Relative Permittivity Dispersion Medium

Delamination and mixing of a high relative permittivity dispersion medium were performed by stirring under the following conditions.
(Conditions for Delamination and Mixing of High Relative Permittivity Dispersion Medium)
  The water-washed product (MXene after intercalation): solid content 0.75 g
  Dispersion medium: 30 mL each of NMF in Examples 1 to 4 and NMAc in Example 5
  Reaction vessel: 100 mL Aiboy
  Temperature: 20 to 25° C. (room temperature)
  Stirring time: 18 hours
  Stirring rotation speed: 700 rpm After completion of the stirring, the mixture was stirred for 15 minutes with a shaker, and then centrifuged at 3500 G for 5 minutes using a centrifuge to recover a supernatant liquid containing MXene formed into a single layer. Thereafter, the obtained supernatant was centrifuged at 10,000 G for 2 hours using a centrifuge, the supernatant was discarded, and the remaining precipitate was obtained as a conductive two-dimensional particle-containing composition having a high dispersion ratio.

Examples 6 to 9

In Examples 6 to 9, a MXene-containing composition was prepared by sequentially performing (1) preparation of a precursor (MAX), (2) etching of the precursor, (3) washing after etching, (4) Li intercalation, (5) delamination, and (6) mixing of a high relative permittivity dispersion medium, which are described in detail below. That is, in Examples 6 to 9, the dispersion medium was replaced from water to a prescribed dispersion medium after MXene was formed into a single layer.

(1) Preparation of Precursor (MAX)

TiC powder, Ti powder, and Al powder (all manufactured by Kojundo Chemical Laboratory Co., Ltd.) were placed in a ball mill containing zirconia balls at a molar ratio of 2:1:1 and mixed for 24 hours. The obtained mixed powder was calcined at 1350° C. for 2 hours under an Ar atmosphere. The calcined body (block-shaped MAX) thus obtained was pulverized with an end mill to a maximum dimension of 40 μm or less. In this way, $Ti_3AlC_2$ particles were obtained as a precursor (powdery MAX).

(2) Etching of Precursor

Using the $Ti_3AlC_2$ particles (powder) prepared by the above method, etching was performed under the following etching conditions to obtain a solid-liquid mixture (slurry) containing a solid component derived from the $Ti_3AlC_2$ powder.
(Etching Conditions)
  Precursor: $Ti_3AlC_2$ (sieving with a mesh size of 45 μm)
  Etching solution composition: acid of type and amount shown in Table 2 below, 49% HF in amount shown in Table 2 below, and $H_2O$
(As the Acid, a Reagent Having a Concentration of HCl of 35 to 37%, a Concentration of HI of 55 to 57%, a Concentration of $H_3PO_4$ of 85%, and a Concentration of $H_2SO_4$ of 98% was Used.)
  Amount of precursor input: 3.0 g
  Reaction vessel: 100 mL Aiboy
  Etching temperature: 35° C.
  Etching time: 24 h
  Stirrer rotation speed: 400 rpm

TABLE 2

| | Type of acid | Amount of acid (mL) | HF (mL) | $H_2O$ (mL) |
|---|---|---|---|---|
| Example 6 | HCl | 54 | 6 | 0 |
| Example 7 | HI | 32 | 6 | 6 |
| Example 8 | $H_3PO_4$ | 15 | 15 | 30 |
| Example 9 | $H_2SO_4$ | 24 | 6 | 30 |

(3) Washing after Etching

The slurry was equally divided into two portions, each of which was inserted into two 50 mL centrifuge tubes. Then, centrifugation was performed at 3500 G for 5 minutes using a centrifuge, and then the supernatant was discarded. Thereafter, (i) 35 mL of pure water was added to the remaining precipitate in each centrifuge tube, (ii) the mixture was stirred with a handshake, (iii) the mixture was centrifuged at 3,500 G for 5 minutes, and (iv) the supernatant was removed. The steps (i) to (iv) were repeated 10 times in total. Finally, centrifugation was performed at 3500 G for 5 minutes using a centrifuge, and then the supernatant was discarded to obtain a $Ti_3C_2T_s$-moisture medium clay.

(4) Li Intercalation

The $Ti_3C_2T_s$-moisture medium clay prepared by the above method was stirred under the following conditions to intercalate Li ions.
(Conditions of Li Intercalation)
  $Ti_3C_2T_s$-moisture medium clay (MXene after washing): solid content 0.75 g
  Pure water: 20 mL
  Li ion source: pure water ($H_2O$) in amount shown in Table 3 below, and Li salt and acid of type and amount shown in Table 3 below
  Reaction vessel: 100 mL Aiboy
  Temperature: 20 to 25° ° C. (room temperature)
  Stirring time: 18 hours
  Stirring rotation speed: 700 rpm

TABLE 3

| | $H_2O$ (mL) | Type of Li salt | Amount of Li salt (g) | Type of acid | Amount of acid (mL) |
|---|---|---|---|---|---|
| Example 6 | 35 | LiCl | 0.75 | — | — |
| Example 7 | 35 | LiCl | 0.75 | — | — |
| Example 8 | 35 | $Li_3PO_4 \cdot 3H_2O$ | 0.68 | $H_3PO_4$ | 5.4 |
| Example 9 | 35 | $Li_2SO_4 \cdot H_2O$ | 2.3 | $H_2SO_4$ | 0.3 |

After completion of the stirring, the stirred product was transferred to a 50 mL centrifuge tube, and centrifuged at 3500 G and 5 minutes using a centrifuge, and then the supernatant liquid was discarded to obtain a Li-intercalated product (MXene clay).

(5) Delamination 35 mL of pure water was added to the Li-intercalated product (MXene clay). Next, after stirring with a shaker for 15 minutes, centrifugation was performed at 3500 G for 5 minutes using a centrifuge. The supernatant was recovered as a single-layer MXene-containing liquid. Then, (i) 35 mL of pure water was added again to the remaining precipitate, and (ii) the mixture was then stirred for 15 minutes with a shaker, and then centrifuged at 3500 G for 5 minutes using a centrifuge to recover the supernatant again. The operations (i) and (ii) were performed 5 times in total. Then, the obtained supernatant was centrifuged at 4300 G for 2 hours using a centrifuge, and the precipitate was recovered as a single-layered MXene-containing clay.

(6) Mixing of High Relative Permittivity Dispersion Medium

NMF as a high relative permittivity dispersion medium was added to the single-layered MXene-containing clay prepared by the above method under the following conditions, and the mixture was stirred to obtain a composition.

Single-layered MXene-containing clay: solid content 0.75 g
Dispersion medium: NMF 30 mL
Reaction vessel: 100 mL Aiboy
Temperature: 20 to 25° ° C. (room temperature)
Stirring time: 18 hours
Stirring: 700 rpm After completion of the stirring, the mixture was stirred for 15 minutes with a shaker, and then centrifuged at 3500 G for 5 minutes using a centrifuge to recover a supernatant liquid containing MXene formed into a single layer. Thereafter, the obtained supernatant was centrifuged at 10,000 G for 2 hours using a centrifuge, the supernatant was discarded, and the remaining precipitate was obtained as a conductive two-dimensional particle-containing composition having a high dispersion ratio.

Comparative Examples 1 and 2

In Comparative Examples 1 and 2, a MXene-containing composition was prepared by sequentially performing (1) preparation of a precursor (MAX), (2) etching of the precursor, (3) washing after etching, and (4) replacement of a dispersion medium, with reference to the production conditions described in Non-patent Document 2 described in detail below.

(1) Preparation of Precursor (MAX)

TiC powder, Ti powder, and Al powder (all manufactured by Kojundo Chemical Laboratory Co., Ltd.) were placed in a ball mill containing zirconia balls at a molar ratio of 2:1:1 and mixed for 24 hours. The obtained mixed powder was calcined at 1350° ° C. for 2 hours under an Ar atmosphere. The calcined body (block-shaped MAX) thus obtained was pulverized with an end mill to a maximum dimension of 40 μm or less. In this way, $Ti_3AlC_2$ particles were obtained as a precursor (powdery MAX).

(2) Etching of Precursor

Using the $Ti_3AlC_2$ particles (powder) prepared by the above method, etching was performed under the following etching conditions to obtain a solid-liquid mixture (slurry) containing a solid component derived from the $Ti_3AlC_2$ powder.

(Etching Conditions)
Precursor: $Ti_3AlC_2$ (sieving with a mesh size of 45 μm)
Etching solution composition: HCl (concentration: 35 to 37%) 23 mL, LiF 3.0 g, $H_2O$ 7 mL
Amount of precursor input: 3.0 g
Reaction vessel: 100 mL Aiboy
Etching temperature: 35° C.
Etching time: 24 h
Stirrer rotation speed: 400 rpm (3) Washing after Etching The slurry was equally divided into two portions, each of which was inserted into two 50 mL centrifuge tubes. Then, centrifugation was performed at 3500 G for 5 minutes using a centrifuge, and then the supernatant was discarded. Thereafter, (i) 35 mL of pure water was added to the remaining precipitate in each centrifuge tube, and (ii) the mixture was stirred with a handshake to discard the supernatant. The operations (i) and (ii) were repeated 10 times. Finally, centrifugation was performed at 3500 G for 5 minutes using a centrifuge, and then the supernatant was discarded to obtain a $Ti_3C_2T_s$-moisture medium clay.

(4) Replacement of Dispersion Medium 20 mL of a dispersion medium (DMSO in Comparative Example 1 and DMF in Comparative Example 2) was added to $Ti_3C_2T_s$-moisture medium clay having a solid content of 0.1 g, and the mixture was stirred by a handshake to discard the supernatant. Thereafter, centrifugation was performed at 10000 G for 1 hour using a centrifuge. (i) 35 mL of the dispersion medium was added again, and the same operation was repeated 3 times in total. Thereafter, 20 mL of a dispersion medium was added, and ultrasonic waves were applied for 30 minutes. Next, centrifugation was performed at 1500 G for 30 minutes using a centrifuge, and then the supernatant was recovered. Finally, the obtained supernatant was centrifuged at 10,000 G for 1 hour using a centrifuge, and the supernatant was discarded to obtain a MXene dispersion composition as a remaining precipitate.

Comparative Example 3

In Comparative Example 3, a single-layered MXene-containing clay of the aqueous dispersion medium was obtained by performing (1) preparation of a precursor (MAX), (2) etching of the precursor, (3) washing after etching, (4) Li intercalation, and (5) delamination in Example 6. In the production of the MXene film described later, a single-layered MXene-containing clay of the aqueous dispersion medium was used.

[Evaluation]

Measurement of the MXene content (solid content) in the composition and composition analysis of a surface group were performed using composition samples obtained in Examples 1 to 9 and Comparative Examples 1 to 3. In addition, an MXene film was formed using the composition sample, and the initial conductivity and a temporal change of the conductivity were determined. Details of each measurement method will be described below.

(Measurement of MXene Content in Composition)

The obtained solvent composition was vacuum-dried at 200° ° C. for 24 hours, and the solid content (MXene) was calculated by the weight before and after drying. The results are shown as "MXene content" in Table 4.

(Composition Analysis of Surface Group of MXene Particle)

The composition of the surface group of the MXene particles was determined by performing XPS measurement under the following conditions using VersaProbe X-ray photoelectron spectrometer manufactured by ULVAC-PHI, INCORPORATED. The results are shown in Table 4.

(XPS Measurement Conditions)
Incident X-ray: monochromatized AlKα
X-ray output: 25.6 W
Measurement area: diameter 100 μm
Photoelectron take-in angle: 45.0 degrees
Pass energy: 23.50 eV

[Production of MXene Film]

The composition obtained in each example was subjected to suction filtration. After the filtration, vacuum drying was performed at 200° ° C. for 24 hours to prepare an MXene film. As a filter for suction filtration, a membrane filter (Durapore, manufactured by Merck KGaA, pore size 0.45 μm) was used. The supernatant contained 0.05 g of solid content of MXene two-dimensional particles and 40 mL of pure water. The density and conductivity of the obtained MXene film were measured as follows.

(Measurement of Initial Conductivity and $\sigma/\sigma_0$ of MXene Film)

The initial conductivity of the obtained MXene film was determined. The surface resistivity was first measured at three points per sample, and this was defined as $R_0$ ($\Omega$). For the measurement of the surface resistivity, the surface resistance of the film was measured by a four-terminal method using a simple low resistivity meter (Loresta AX MCP-T370, manufactured by Mitsubishi Chemical Analytech Co., Ltd.). The thickness (μm) was measured at three points per sample. A micrometer (MDH-25 MB, manufactured by Mitutoyo Corporation) was used for the thickness measurement. The volume resistivity was determined from the surface resistance and the film thickness, and the initial conductivity (S/cm) was calculated by taking the reciprocal of the value. The average value ($\sigma_0$) of the initial conductivities of the three points was adopted. The results are shown in Table 4.

Similarly to a test apparatus shown in FIG. 5c of Document: Pristine Titanium Carbide MXene Films with Environmentally Stable Conductivity and Superior Mechanical Strength (Adv. Funct. Mater. 2020, 30, 1906996), a small amount of water was put in a bottom of a sealed desiccator, and the MXene film was placed so as not to be in direct contact with the water, and held at room temperature in a humid environment saturated in humidity for 7 days. Thereafter, the surface resistivity was measured at three points per sample in the same manner as described above, and the conductivity (S/cm) was calculated from the film thickness. The average value ($\sigma$) of the conductivities of the three points after 7 days was adopted. Then, as a ratio of the average value ($\sigma$) of the conductivities after 7 days to the average value (go) of the initial conductivities, $(\sigma/\sigma_0) \times 100$ (%) was determined. The results are shown in Table 4. In this Example, a case where $(\sigma/\sigma_0) \times 100(\%)$ was 70% or more was evaluated as having high moisture absorption resistance and high reliability. The $(\sigma/\sigma_0) \times 100(\%)$ is preferably 80% or more.

tivity. In addition, in Examples 6 to 9 in which preferably the modifier or terminal T contained a chlorine atom or M of the layer was bonded to at least one selected from the group consisting of $PO_4^{3-}$, I and $SO_4^{2-}$, the initial conductivity was higher and 6000 S/cm or more, the change in conductivity after 7 days was 85% or more and high in each example, and a conductive film having higher moisture absorption resistance was obtained.

On the other hand, Comparative Example 1 and Comparative Example 2 are examples in which DMSO and DMF were used for a dispersion medium; however, in these examples, the dispersibility of the MXene particles was poor, and the MXene particles were aggregated. The initial conductivity of the formed conductive film was considerably low, and the conductivity after 7 days was reduced to about half of the initial conductivity. The reason for this is considered to be that the conductive film formed using the composition having poor dispersibility is not dense, and moisture enters to cause significant deterioration over time. On the other hand, Comparative Example 3 is an example in which water was used for a dispersion medium. In this example, the initial conductivity was high; however, the conductivity after 7 days was greatly reduced. Although the dispersion media DMSO and DMF used in Comparative Example 1 and Comparative Example 2 are the same organic dispersion media as NMF, the dispersibility of MXene particles is clearly different, this difference in dispersibility greatly affects the conductivity and moisture absorption resistance (reliability) of the conductive film formed by each composition, and it has been found that a conductive film having both excellent conductivity and excellent moisture absorption resistance (reliability) can be obtained by providing a composition containing the dispersion medium according to the present embodiment.

The disclosure herein may include the following aspects.

<1> A conductive two-dimensional particle-containing composition comprising:

TABLE 4

| | Dispersion medium | Mxene content (% by mass) | MXene surface group | Initial conductivity (S/cm) | Change in conductivity after 7 days $(\sigma/\sigma_0) \times 100$ |
|---|---|---|---|---|---|
| Example 1 | NMF | 1.7 | O, OH, F | 5900 | 85% |
| Example 2 | NMF | 2.1 | O, OH, F | 5100 | 81% |
| Example 3 | NMF | 1.8 | O, OH, F | 5400 | 75% |
| Example 4 | NMF | 1.0 | O, OH, F | 5200 | 79% |
| Example 5 | NMAc | 1.1 | O, OH, F | 5000 | 74% |
| Example 6 | NMF | 3.2 | Cl, O, OH, F | 6200 | 86% |
| Example 7 | NMF | 2.3 | I, O, OH, F | 6100 | 87% |
| Example 8 | NMF | 2.0 | $PO_4^{3-}$, O, OH, F | 6500 | 90% |
| Example 9 | NMF | 1.8 | $SO_4^{2-}$, O, OH, F | 6000 | 86% |
| Comparative Example 1 | DMSO | 1.1 | OH, O, F, Cl | 2800 | 54% |
| Comparative Example 2 | DMF | 0.3 | OH, O, F, Cl | 1300 | 43% |
| Comparative Example 3 | H2O | 3.0 | OH, O, F, Cl | 5000 | 49% |

The following can be seen from Table 4. That is, the composition of Examples 1 to 5 according to the present embodiment had a MXene content of 1.0% by mass or more and a high dispersion rate, and the conductive film obtained using the composition had an initial conductivity of 5000 S/cm or more and a change in conductivity after 7 days of 70% or more, and could almost maintain the initial conduca conductive two-dimensional particle of a layered material including one or a plurality of layers; and a dispersion medium having a relative permittivity greater than that of water, wherein the one or plurality of layers includes a layer body represented by:

$$M_mX_n$$

wherein M is at least one metal of Group 3, 4, 5, 6, or 7,
X is a carbon atom, a nitrogen atom, or a combination thereof,
n is 1 to 4, and
m is more than n and 5 or less, and
a modifier or terminal T existing on a surface of the layer body, wherein T is at least one selected from the group consisting of a hydroxyl group, a fluorine atom, a chlorine atom, an oxygen atom, and a hydrogen atom, and
the conductive two-dimensional particle has a fluorine element and an oxygen element.

<2> The conductive two-dimensional particle-containing composition according to <1>, wherein in the conductive two-dimensional particle, the modifier or terminal T contains a chlorine atom, or M of the layer is bonded to at least one selected from the group consisting of $PO_4^{3-}$, I, and $SO_4^{2-}$.

<3> The conductive two-dimensional particle-containing composition according to <1> or <2>, wherein the dispersion medium having a relative permittivity greater than that of water contains at least one or more of N-methylformamide and N-methylacetamide.

<4> The conductive two-dimensional particle-containing composition according to any one of <1> to <3>, wherein a content of the conductive two-dimensional particle is 1% by mass or more.

<5> The conductive two-dimensional particle-containing composition according to any one of <1> to <4>, further comprising a polymer.

<6> A conductive film comprising the conductive two-dimensional particle-containing composition according to any one of <1> to <5> and having a conductivity of 5000 S/cm or more.

<7> A method of producing a conductive two-dimensional particle-containing composition, the method comprising:
(a) preparing a precursor represented by a formula below:

$$M_mAX_n$$

wherein M is at least one metal of Group 3, 4, 5, 6, or 7,
X is a carbon atom, a nitrogen atom, or a combination thereof,
A is at least one element of Group 12, 13, 14, 15, or 16,
n is 1 to 4, and
m is more than n and 5 or less;
(b) performing an etching treatment for removing at least a part of A atoms from the precursor using an etching solution;
(c) washing an etched product obtained by the etching treatment with water to obtain a water-washed product;
(d) performing an intercalation treatment of a compound for interlayer insertion, the intercalation treatment including stirring a mixed solution of the water-washed product and the compound for interlayer insertion of the water-washed product; and
(e) forming a composition by delamination and mixing of a dispersion medium having a relative permittivity greater than that of water using an intercalated product obtained by the intercalation treatment.

The method of producing a conductive two-dimensional particle-containing composition according to <7>, wherein the mixed solution of the water-washed product and the compound for interlayer insertion of the water-washed product is made alkaline in the (d), and the intercalated product and the dispersion medium having a relative permittivity greater than that of water are mixed, and delamination and mixing of the dispersion medium having a relative permittivity greater than that of water are performed together in the (e).

<9> The method of producing a conductive two-dimensional particle-containing composition according to <7> or <8>, wherein lithium hydroxide is used as the compound for interlayer insertion of the water-washed product in the (d).

<10> The method of producing a conductive two-dimensional particle-containing composition according to <7>, wherein the mixed solution of the water-washed product and the compound for interlayer insertion of the water-washed product is made acidic in the (d), and the intercalated product is subjected to delamination, and then a delaminated product obtained by the delamination and the dispersion medium having a relative permittivity greater than that of water are mixed in the (e).

<11> The method of producing a conductive two-dimensional particle-containing composition according to <7>, wherein the mixed solution of the water-washed product and the compound for interlayer insertion of the water-washed product is made acidic in the (d), and the intercalated product and the dispersion medium having a relative permittivity greater than that of water are mixed, and delamination and mixing of the dispersion medium having a relative permittivity greater than that of water are performed together in the (e).

The conductive two-dimensional particle-containing composition of the present disclosure is useful for formation of a conductive film which has high initial conductivity and in which deterioration over time of conductivity is suppressed. The conductive film formed using the conductive two-dimensional particle-containing composition can be used for any suitable application, and can be preferably used as, for example, an electrode such as an electromagnetic shield (EMI shield), a capacitor electrode, a battery electrode, a biological signal sensing electrode, a sensor electrode, or an antenna electrode.

EXPLANATION OF REFERENCES 1a, 1b Layer body ($M_mX_n$ layer)
3a, 5a, 3b, 5b Modifier or terminal T
7a, 7b MXene layer
10, 10a, 10b MXene particle (conductive two-dimensional particle, particle of layered material)

The invention claimed is:
1. A conductive two-dimensional particle-containing composition comprising:
a conductive two-dimensional particle of a layered material including one or a plurality of layers;
a dispersion medium having a relative permittivity greater than that of water;
a fluorine element on a surface of the conductive two-dimensional particle; and
an oxygen element on the surface of the conductive two-dimensional particle, wherein the one or plurality of layers includes a layer body represented by:

$$M_mX_n$$

wherein M is at least one metal of Group 3, 4, 5, 6, or 7,
X is a carbon atom, a nitrogen atom, or a combination thereof,
n is 1 to 4, and
m is more than n and 5 or less, and
a modifier or terminal T existing on a surface of the layer body, wherein T is at least one selected from the group consisting of a hydroxyl group, a fluorine atom, a chlorine atom, an oxygen atom, and a hydrogen atom.

2. The conductive two-dimensional particle-containing composition according to claim 1, wherein the fluorine element and the oxygen element are on the surface of the layer body.

3. The conductive two-dimensional particle-containing composition according to claim 1, wherein in the conductive two-dimensional particle, the modifier or terminal T contains a chlorine atom.

4. The conductive two-dimensional particle-containing composition according to claim 1, wherein in the conductive two-dimensional particle, M of the layer body is bonded to at least one selected from the group consisting of $PO_4^{3-}$, I, and $SO_4^{2-}$.

5. The conductive two-dimensional particle-containing composition according to claim 1, wherein the dispersion medium contains at least one or more of N-methylformamide and N-methylacetamide.

6. The conductive two-dimensional particle-containing composition according to claim 1, wherein the dispersion medium contains 50 vol % or more of at least one of N-methylformamide and N-methylacetamide.

7. The conductive two-dimensional particle-containing composition according to claim 1, wherein a content of the conductive two-dimensional particle in the conductive two-dimensional particle-containing composition is 1% by mass or more.

8. The conductive two-dimensional particle-containing composition according to claim 1, further comprising a polymer.

9. The conductive two-dimensional particle-containing composition according to claim 8, wherein a mass ratio of the conductive two-dimensional particles is 50% or more.

10. A conductive film comprising the conductive two-dimensional particle-containing composition according to claim 1, and the conductive film having a conductivity of 5000 S/cm or more.

11. A method of producing a conductive two-dimensional particle-containing composition, the method comprising:

(a) preparing a precursor represented by:

$$M_mAX_n$$

wherein M is at least one metal of Group 3, 4, 5, 6, or 7,
X is a carbon atom, a nitrogen atom, or a combination thereof,
A is at least one element of Group 12, 13, 14, 15, or 16,
n is 1 to 4, and
m is more than n and 5 or less;

(b) removing at least a part of A atoms from the precursor using an etching solution to obtain an etched product;

(c) washing the etched product with water to obtain a water-washed product;

(d) performing an intercalation treatment including stirring a mixed solution of the water-washed product and a compound for interlayer insertion of the water-washed product to produce an intercalated product; and (e) delamination of the intercalated product and mixing of a dispersion medium having a relative permittivity greater than that of water with the intercalated product.

12. The method of producing a conductive two-dimensional particle-containing composition according to claim 11, wherein
the mixed solution of the water-washed product and the compound for interlayer insertion of the water-washed product is made alkaline, and
the delamination of the intercalated product and the mixing of the dispersion medium with the intercalated product are performed together.

13. The method of producing a conductive two-dimensional particle-containing composition according to claim 11, wherein lithium hydroxide is the compound for interlayer insertion of the water-washed product.

14. The method of producing a conductive two-dimensional particle-containing composition according to claim 11, wherein
the mixed solution of the water-washed product and the compound for interlayer insertion of the water-washed product is made acidic, and
the intercalated product is subjected to delamination to produce a delaminated product, and then the delaminated product and the dispersion medium are mixed.

15. The method of producing a conductive two-dimensional particle-containing composition according to claim 11, wherein
the mixed solution of the water-washed product and the compound for interlayer insertion of the water-washed product is made acidic, and
the delamination of the intercalated product and the mixing of the dispersion medium with the intercalated product are performed together.

* * * * *